(12) United States Patent
Johnston et al.

(10) Patent No.: US 7,033,553 B2
(45) Date of Patent: Apr. 25, 2006

(54) CHEMICAL REACTOR

(75) Inventors: Anthony Johnston, New South Wales (AU); William Levy, Paris (FR)

(73) Assignee: Meggitt (UK) Limited, Dorset (GB)

( * ) Notice: Subject to any disclaimer, the term of this patent is extended or adjusted under 35 U.S.C. 154(b) by 647 days.

(21) Appl. No.: 09/769,577

(22) Filed: Jan. 25, 2001

(65) Prior Publication Data
US 2002/0018739 A1    Feb. 14, 2002

Related U.S. Application Data

(60) Provisional application No. 60/184,007, filed on Feb. 22, 2000.

(30) Foreign Application Priority Data

Jan. 25, 2000  (GB) ..................................... 0001699
Jul. 13, 2000  (GB) ..................................... 0017187

(51) Int. Cl.
*F28F 3/08* (2006.01)
(52) U.S. Cl. ...................... 422/199; 422/198; 422/188; 422/190
(58) Field of Classification Search ................ 422/198, 422/199, 188, 189, 190, 193
See application file for complete search history.

(56) References Cited

U.S. PATENT DOCUMENTS

| 4,075,092 A | 2/1978 | White et al. |
|---|---|---|
| 4,101,281 A | 7/1978 | Pagani |
| 4,153,855 A | 5/1979 | Feingold |
| 4,190,079 A | 2/1980 | White et al. |
| 4,231,979 A | 11/1980 | White et al. |
| 4,714,592 A | 12/1987 | Zanma et al. |
| 4,956,510 A * | 9/1990 | Harandi ...................... 585/415 |
| 5,180,480 A | 1/1993 | Manz |
| 5,324,452 A * | 6/1994 | Allam et al. ................. 252/373 |
| 5,494,641 A | 2/1996 | Krstanovic |
| 5,540,899 A | 7/1996 | Koves |
| 5,573,736 A * | 11/1996 | Jubin, Jr. ..................... 422/191 |
| 5,585,074 A | 12/1996 | Zardi et al. |
| 5,727,618 A | 3/1998 | Mundinger et al. |
| 5,744,100 A | 4/1998 | Krstanovic |

(Continued)

FOREIGN PATENT DOCUMENTS

DE          43 13 723          11/1994

(Continued)

OTHER PUBLICATIONS

D. Reay, "*Learning from Experiences with Compact Heat Exchangers*", Doc. No. XP-002167972, CADDETT Analyses Series No. 25, pp. 32-42, 85-86, 98, 141-142, and XI-XII (Jun. 1999).

*Primary Examiner*—Len Tran
(74) *Attorney, Agent, or Firm*—Boyle Fredrickson Newholm Stein & Gratz S.C.

(57) ABSTRACT

A reactor comprises a reaction zone, optionally containing a catalyst bed, and heat exchange means inoperative contact with the reaction zone, e.g. embedded in a catalyst bed, and arranged so as to received reactants for heat exchange purposes, wherein the heat exchange means is formed from a plurality of superposed metal plates wherein fluid flow channels have been formed, according t a pre-determined pattern, the channel-bearing plates being aligned during superposition to define discrete heat exchange pathways respectively for reactant and working fluids, and the said plates are diffusion bonded together.

23 Claims, 4 Drawing Sheets

U.S. PATENT DOCUMENTS 5,804,701 A    9/1998  Berger
6,695,044 B1 * 2/2004  Symonds ................... 165/166

FOREIGN PATENT DOCUMENTS

| | | |
|---|---|---|
| EP | 0 386 693 | 3/1990 |
| EP | 0 386 692 | 6/1990 |
| EP | 0 539 834 | 10/1992 |
| GB | 671 573 | 5/1952 |
| GB | 2 333 351 | 7/1999 |
| WO | WO 95/01834 | 1/1995 |
| WO | WO 96/12316 | 4/1996 |
| WO | WO 96/39260 | 12/1996 |
| WO | WO 96/42004 | 12/1996 |
| WO | WO 97 21064 | 6/1997 |
| WO | WO 98.32535 | 7/1998 |

* cited by examiner

PHTHALIC ANHYDRIDE PCR BED TEMPERATURE PROFILE
(Ortho xylene feed >100 g/Nm3)

PHTHALIC ANHYDRIDE PCR

CHEMICAL REACTOR

CROSS-REFERENCE TO A RELATED APPLICATION

This application claims priority under 35 U.S.C. §119(e) to U.S. Provisional Patent Application No. 60/184,007 entitled Catalytic Bed Reactor, filed Feb. 22, 2000, and under 35 USC §119(a) to G.B. 0001699.8, filed Jan. 25, 2000 and G.B. 0017187.6, filed Jul. 13, 2000, the entirety of each of which is incorporated herein by reference.

FIELD OF THE INVENTION

The present invention is applicable in the field of chemical engineering and especially relates to improvements in chemical reactors. In general the invention relates to process control of temperature in a chemical reaction system and processing plant. Particularly the invention provides a reactor suitable for rapid conversion of a fluid reactant within the reactor in which the reactant temperature is maintained at a desired profile indirectly by means of a heat exchanging fluid.

BACKGROUND OF THE INVENTION

In the majority of chemical processes there is a heat demand or a need to dissipate heat. Therefore, a wide range of chemical plant is involved in containing or conveying fluids which must at some stage of the process be either heated or cooled. One might consider furnaces, evaporators, distillation units, dryers and reaction vessels as plant where heat transfer manifests itself as a design and operational problem. In particular many industrial chemical processes employ reactors in which reactions are effected under given temperature and pressure conditions in the presence of a catalyst. Almost all these reactions generate or absorb heat i.e. they are exothermic or endothermic. The cooling effects for endothermic reactions generally adversely affect the rate of reaction and the corresponding parameters such as conversion and selectivity of the products from the reaction. The uncontrolled heating of exothermic reactions generally leads to damage to the associated apparatus as the temperature can rise to a very high level. The reaction in such a case may become uncontrolled (so-called "run away reaction") and lead to unwanted by-products and undesired effects, such as deactivation of a process catalyst. Furthermore, whilst an ideal catalyst does not theoretically participate in a reaction in reality many catalysts become degraded or poisoned as the reaction progresses and on an industrial scale the costs associated with catalyst regeneration or replacement represent a significant burden. It will be understood that such costs also must include the down time for the plant or restrictions on capacity if a particular reactor has to be off-line for catalyst re-generation purposes. Therefore, it is desirable to prolong the life of a catalyst bed in view of the significant cost benefits that may be obtained overall. The invention to be described hereinafter is ideally suited to use in catalytic reactor design but can be adapted for other purposes. No distinction is made as to the application thereof to batch or continuous reaction systems.

Those skilled in the art recognise that it is beneficial for the changes in temperature resulting from the heating or cooling effects of the reactions to be controlled. It is well known that maintaining the temperature of the reaction at a given constant level may result in significant advantages to the reaction, such as improved conversion and selectivity, prolonged life of the catalyst and associated apparatus, reduced levels of unwanted by-products etc. In some cases, a varying of the constant temperature profile may be more beneficial.

In order to effectively control the temperature of reactions within an acceptable range, the chemical industry has devised several arrangements, those commonly used being discussed in standard references and texts e.g. one might consider the general teachings by Octave LEVENSPIEL in Chapter 19 of Chemical Reaction Engineering. The relative merits of each approach is also discussed therein.

Conventionally, the temperature inside reactors has been controlled by passing an auxiliary heat exchanging fluid through tubes or between plates, same forming a heat transfer conductive medium or thermal bridge whilst separating the reaction species from the auxiliary heat exchange fluid. Thus it will be understood that in such an indirect heat transfer system there is on the one hand a process path or zone and on the other an auxiliary fluid path or zone separated by the tube wall(s) or plate surface(s).

Considering this well known concept in relation to packed catalytic bed reactors, reactant fluid is passed through the catalyst bed and heat of reaction therein is controlled by contacting the catalytic bed reaction zone with such auxiliary fluid containing tubes or plates. However, particularly for highly exothermic reactions, such an approach has not been found to be ideal since the packed bed often develops heat gradients, e.g. the catalyst bed will be cooler at its areas of contact with the said tubes or plates and hotter within its depth remote from said tubes or plates, permitting formation of hot spots or moving hot fronts leading to variations in reaction progress within the bed as a whole. Thus at such a hot spot the reaction may proceed faster and hence catalyst therein will be more rapidly degraded. This will be particularly significant in the case of large plants.

Thus, it may be considered that the problems to be solved include the need to keep reactants and catalyst within a satisfactory temperature range with a view to maximising reaction rate; minimising reactor or catalyst volume; maximising yield of desired products, minimising damage to catalyst (e.g. due to excessive heat, or direct contamination with liquid phases); and minimise by-product formation.

Typical approaches to such problems include the addition of quench gas to cool the system, but this leads to a loss in efficiency and may thus have an adverse effect on yield. A further approach is to introduce a heat exchange step between adiabatic beds, which may involve the incorporation of heat exchangers into the reactor, but this leads to both design and operational problems due to the bulk of tubular designs and a lack of differential pressure containment with plate exchangers. There are also problems with reactant re-distribution. Alternatively, the reactants may be removed from the reactor for intermediate heat exchange e.g. cooling, but this also has an impact on plant design and process operation due to the additional expensive piping, and distribution problems with each extraction and re-injection. Thus this is not practical to do more than once or twice in any particular system.

A further approach is to adopt continuous heat exchange by packing tubes or plates into the catalyst bed, but this leads to design inflexibility, additional expense, uneven packing of catalyst, and of course difficulty in replacing or regenerating the catalyst. Alternatively, heat exchange tubes, plates and passages of the reactor may be coated with catalyst, but here again this leads to an inflexible design, difficulties in applying catalyst reliably and restrictions upon available superficial catalyst surface area. Also with this approach, there are obvious difficulties in replacing or regenerating the catalyst.

Fluidised bed reactors represent another potential solution to these problems, but these may not be ideally suited to all or certain reaction systems.

The possibility of using an inert or reactive diluent to ballast the temperature of reactants in adiabatic beds has been considered but such a diluent must be heated, cooled, and pumped which places extra energy demands on the process and moreover, may also interfere with the intended reaction by presenting a diffusion barrier to reactants.

The problems may be further explained by considering the principles of the staged adiabatic packed bed reactor system which is an example of an arrangement designed to offer more control over the reactant temperature. This system uses an arrangement wherein a number of discrete, spaced apart zones of reaction are provided with means therebetween to control the temperature of the products leaving a first zone of reaction prior to entering the next reaction zone. No heat exchanging means is provided to control the temperature of the reaction in the zones of the reaction. Thus the reactant fluid entering the reactor at a desired temperature passes through a packed bed containing catalyst. Upon exiting this first stage, the reactant gas and any products will have a temperature higher or lower than that of the initial temperature depending upon the reaction thermal characteristics. A heat exchanger then heats or cools the reactant gas to a second desired temperature, which may or may not be equivalent to the temperature of the first, before passing to the next packed bed i.e. the second stage. This sequence is repeated until the desired conversion is obtained. Thus the temperature profile of the reaction will be stepped within an acceptable range of temperature, and will therefore not be truly isothermal.

An alternative proposal for a process and apparatus for controlling reaction temperatures is disclosed in U.S. Pat. No. 5,600,053. This arrangement uses corrugated heat exchange plates spaced apart with each plate defining a boundary of a heat exchange flow channel on one side of the plate and a boundary of a reaction flow channel on the other. In the arrangement, a heat exchange fluid passes in the first of the aforementioned channels and a reactant stream passes through the second, preferably with a catalyst being present. This arrangement is intended to eliminate or minimise the typical step-wise approach to the so-called isothermal condition objective.

However, the arrangement proposed in U.S. Pat. No. 5,600,053 requires adjacent corrugated plates to be joined together. For this purpose, smooth edges are provided to facilitate the assembly of superposed multiple plates to form channels. The plates are joined, such as by welding, along these smooth edges and hence the integrity of the seal of the channels formed by the corrugations in adjacent plates is not ideal, particularly where a large pressure differential exists between the heat exchange flow channels and the reaction flow channels since this will tend to urge the adjacent plates apart. This arrangement will thus place unnecessary constraints on parameters of the reaction, namely the relationship between the pressure of the heat exchanging fluid and that of the reactant gas.

An earlier system is described in U.S. Pat. No. 5,073,352 which proposes an apparatus for conducting a process of reforming gasolines, under low pressure and in the presence of at least one catalyst, in which heat required for the reaction is provided by a heat carrying fluid such as natural gas.

The apparatus described therein comprises a number of discrete reaction cells being arranged vertically and being of substantially parallelepipedic configuration. The cells are laterally spaced apart, thus forming channels therebetween for flow of the heat carrying fluid. The reforming catalyst-containing chambers are respectively either isothermal or adiabatic and dimensioned such that height (H), width (W) and thickness (T) satisfy the conditions H>W>T, and H is at least twice the value of W, W lying in the range of 50 mm to 10,000 mm (0.05–10 meters) and T lies in the range of 2 mm 2,000 mm (0.002–2 meters). Thus there remains the possibility of hot spots and less than satisfactory thermal control in such large catalytic reactor volumes.

It is known to the man skilled in the art that the heat transfer coefficient in a packed bed is mainly dependent upon the catalyst particle size and the reactant fluid velocity through the catalytic bed. Unfortunately, both these parameters are process requirements and hence cannot be changed in order to improve the heat transfer coefficient in the packed bed, and hence in the reaction cells described in U.S. Pat. No. 5,073,352. Additionally, it is difficult to move catalyst between narrow gaps or tubes, imposing limits on the dimensions of gaps or tubes through which catalyst is designed to flow.

Thus reactors of the known types according to the existing art have many significant limitations imposed on the heat transfer capability. Plate reactors offer some advantages over tubular reactors on the auxiliary medium side, but the end result is not significant since the overall heat transfer coefficient is generally governed by the process side as discussed above. Tubular reactors on the other hand offer advantages over plate reactors with regard to mechanical capability, due to increased resistance to differential pressure between the reactant fluid and the heat exchanging fluid.

There are also industrial chemical processes where the reaction is performed without the presence of a catalyst. Such reactions are frequently carried out in the liquid phase in a stirred tank (a so-called CSTR reactor), and may be continuous or batch or semi-batch processes.

Heating or cooling of CSTR reactors is typically either by an external heat transfer jacket, an internal heat transfer coil, or by circulating the reactants through an external heat exchanger. Generally both an external jacket and internal coil afford only a limited heat transfer surface. External heat transfer requires pumped circulation, and imperfect mixing within the reactor can result in significant deviation between the composition of the fluid circulated through the external heat exchanger and bulk mixed fluid composition in the reactor. This latter problem is most likely to arise whilst a reactant is being added to the reactor.

Fluid mixing within a CSTR is dependent on such factors as the agitator and baffle design, agitator speed, and the physical properties of the reactant mixture. Efforts to ensure good mixing frequently meet with unsatisfactory results, and reaction conditions often need to be less than optimal to allow for variations in reactant concentration.

As a result of the shortcomings outlined above, some reactions are carried out with a reactor residence time that is much longer than needed by the reaction kinetics alone, due to poor heat and/or mass transfer, with consequent loss of reaction selectivity. Further, CSTRs are characterised by substantially complete back mixing of reaction products with reactant; this can inhibit the reaction rate, and can also result in product loss through unwanted further reactions. The invention enables a fast, heat transfer-limited reaction to be carried out with a much reduced residence time, in a sequential series of low residence time stages which approximates to a so-called plug flow reactor.

Considering the foregoing matters, it is an object of this invention to provide improvements in chemical plant design and methods of operation thereof with a view to obviating or mitigating the drawbacks of the existing or previously proposed designs and methods.

Particularly, it is an aim of the present invention to provide an apparatus and a process for the control of reaction temperature within an acceptable range during operation of the chemical process by an indirect heat transfer method using a heat exchanging fluid.

Another object of the invention to be described more particularly hereinbelow is to provide an apparatus permitting control of the reactant temperature closely within a desired profile, more specifically, aiming to maintain the temperature at a substantially constant level i.e. to offer attainment of an acceptable approximation to an isothermal reaction zone in so far as is practical on an industrial scale.

It is a further object of the invention to provide chemical plant which is improved over known plant equipment in terms of both cost and space efficiency considerations.

SUMMARY OF THE INVENTION

The invention addresses the problems observed in the prior art by adopting the approach of staged adiabatic reactors and improving the performance thereof by design of a reactor comprising a reaction zone and heat exchange means of the plate type in operative contact with the reaction zone so as to receive reactants for heat exchange purposes, wherein the heat exchange means is formed from a plurality of superposed metal plates wherein fluid flow channels have been formed, e.g., by etching, chemical or hydraulic milling, according to a pre-determined pattern, said channel-bearing plates being aligned during superposition to define discrete heat exchange pathways for fluids and diffusion bonded together. The plate exchangers to be adopted are panels made according to an etching, chemically milling or hydraulic cutting technique commonly referred to as printed circuit design since the manner of fluid channel definition and formation frequently adopted is analogous to the manufacture of printed circuit boards.

Ideally, multiple heat exchange panels are embedded within the reaction zone the design being such that the contact face area of the panels is similar to the contact face area of the reaction zone. The reaction zone may consist of one or more catalyst beds. A plurality of such catalyst beds can be arranged in succession having a heat exchange panel arranged between each bed, typically providing at least 3 such beds in series.

The heat exchanger of choice is one formed from a plurality of plates superposed and diffusion bonded to form a stack of plates, wherein fluid channels are defined in said stack by virtue of a pre-treatment of said plates wherein each plate is selectively configured according to the desired pattern of channels by a chemical treatment to remove surface material e.g. by chemical or hydraulic etching or by a water jet, to a desired depth. Such a pre-treatment of the plates is conducted in a manner in some degree analogous to manufacture of printed circuit boards (PCBs) and for this reason the reactor design described herein can be described as a printed circuit reactor (PCR). Likewise, the heat exchanger thus formed for inclusion in the reactor may be referred to as a printed circuit heat exchanger (PCHE).

The proposed reactor design offers an infinite variety of auxiliary heat exchanging fluid and reactant fluid pathways of very small dimensions which enables significantly enhanced process control. Typically the passages are of very small bore, typically of less that about 3 mm in depth. The nature of the design is such that it lends itself to construction of heat exchangers in small sub-panel units that can be readily fastened together, e.g. by welding. Furthermore, it is possible to provide designs of reactor in which the PCHE panel thickness differs at different stages of the reactor, and to vary the catalyst bed thickness stage to stage. The composition of the catalyst in each stage may be the same or varied according to process requirements with a view to enhancing production.

The invention can also be applied to non-catalytic processes, wherein there may be one or more reactor compartments, bounded by late or PCHE type heat exchangers at the inlet and/or outlet. Possible embodiments of the reactor may be considered as analogous to the foregoing catalytic reactor descriptions, with suitably dimensioned reactor compartment(s) in place of the catalytic bed(s).

Where there is a requirement to mix the reactant fluids, the feed inlet PCHE panel may incorporate flow passages arranged to both preheat each reactant fluid to the desired inlet temperature, and also to combine two or more fluids, by combining individual passages, thereby achieving uniform intimate mixing of the reactant fluids.

Further, it will be apparent that stagewise addition of a reactant may be simply achieved by distributing the reactant via successive PCHE panels preceding each reaction compartment.

An advantage of the invention is that close control of the reactant temperature profile can be achieved, and the temperature profile may be adjusted between sequential reaction compartments so that the reaction conditions may be optimised with respect the changing reactant and product concentrations. Accurate temperature control avoids transient or localised overheating of reactants or products. This is of particular significance where one of the reactants is particularly heat-sensitive, and can be thermally degraded in the event of incomplete mixing. Further, by approximating a plug flow reactor, back mixing is substantially reduced, and unwanted reactions may be avoided. Hence the reaction conversion, yield, and product quality may be improved.

A further significant benefit of the invention is that thorough and uniform mixing is achieved without use of an agitator. This results in energy savings, and eliminates the cost of maintaining agitator bearings and shaft seals.

Also, by reducing the residence time required, the hold-up volume of reactants and products is very much reduced. Substantial improvements in process safety are achieved where the reactants or products are hazardous eg toxic or flammable.

Preferably, all the heat exchangers used in the reactor are panels that are entirely of the printed circuit heat exchanger type (PCHE). Typically in such an arrangement, the heat transfer dimensions are smaller than catalyst particle dimensions, ensuring that the temperature profiles inherent in heat transfer to fluids in passages are not significant relative to the catalyst particle size. Also, the dimensions of the heat transfer are relatively small in comparison to the bed depth, so that any passage-scale temperature profiles occupy only a very small proportion of the individual catalyst bed lengths, e.g. typically up to about 200 mm. This contrasts significantly with the prior art use of exchanger tubes of say 25 mm outer diameter, which essentially cause downstream wakes in the temperature profiles which are then necessarily of a scale that is significantly larger than the individual catalyst particles and extend across at least a significant proportion of each catalyst bed.

The catalyst may be of variable form, e.g. selected from spherical, cylindrical, hollow bodies, solid particles, expanded or porous solids, coated matrix catalyst or the like supported catalysts. Commonly particles of up to about 10 mm (major dimension) are contemplated.

Preferably, the potential for catalyst particles to enter the passages of the PCHE is restricted by provision of a screen ideally of a durable mesh capable of restraining particles of catalyst at operational temperatures.

The heat transfer medium may be a gas, or a liquid without phase change, or may be either boiling or condensing according to the process (exothermic or endothermic), and it is considered that reactants may be used as a heat transfer medium during the reaction process, prior to entry to the catalytic reaction zone enabling a reactant pre-heat step.

The PCHE panel may be of a thickness intended to minimise pressure drop between catalytic zones, e.g. up to about 100 mm. This also enables matching of heat transfer area of PCHE and catalyst bed volume to achieve a cost-effective design, which is difficult to achieve with the prior art coated passage or packed plates or tube designs.

The PCHE panel design enables variable passage length and configuration, e.g. tortuous pathways with convolutions and or zigzags to enhance heat transfer, thereby permitting closer approach of reactant and heat transfer medium temperatures, and offering temperature profiles in the system which are more consistent with design parameters.

The invention further addresses the drawbacks of the known art by providing a process for conversion of a fluid reactant which process according to the invention uses a reactor comprising reaction zone, which may consist of one or more catalyst beds and heat exchange means of the plate type in operative contact with said zone and having discrete fluid pathways for heat exchange between fluids at differing temperatures whilst avoiding mixing of the fluids, the said process providing the appropriate fluid reactant species to be converted in the reaction zone within the reactor and at a predetermined stage of reaction introducing at least a portion of the fluid reactant species into a reactant fluid pathway within said heat exchange means, and also introducing an auxiliary fluid at a temperature differing from that of the fluid reactant species into another fluid pathway within said heat exchange means and juxtaposed to the first whereby the discrete nature of the respective pathways permits indirect heat exchange between the fluid reactant species, said process being optionally repeated in successive stages.

According to a modification of the process additional fluid reactant species may be introduced at subsequent catalyst bed stages. Thus although it is envisaged that the process can be operated in a series of stages in the manner of the known staged adiabatic reactor systems the proposed reactor design permits greater control over the process not only in terms of heat management but also in terms of chemical reaction control.

Thus according to one aspect of the present invention, there is provided an apparatus for controlling the temperature profile of a reactant fluid in the presence of a catalyst during an endothermic or exothermic chemical reaction, comprising a reactor having reactant fluid inlet means and reactant fluid outlet means; catalytic beds being provided therebetween, spaced apart by a printed circuit heat exchanger (PCHE); said heat exchanger comprising heat exchanging fluid inlet means, heat exchanging fluid outlet means, a first channel or set of channels for passage of the heat exchanging fluid, and a second channel or set of channels in communication with the adjacent catalytic beds to allow passage of the reactant fluid from one catalytic bed to the next, said second channel or set of channels not being in communication with the reactant fluid.

Preferably a screen made of a fine mesh lines the walls of the catalytic bed, and said walls are ideally formed at least in part by plates of the said heat exchangers. The mesh acts to resist migration of catalyst into the reactant fluid-receiving channels of the heat exchanger down stream of the catalytic reaction zone.

The heat exchanger stack may be formed from a length or block of superposed plates by division e.g. by cutting into individual slices of a desired dimension which enables very slim designs.

Thus in one construction, a first such channel or set of channels is perpendicular to a second such channel or set of channels. In an alternative construction, the respective channels are parallel. Naturally one would generally arrange the construction such that juxtaposed channels contain respectively reactant fluid species on the one hand and auxiliary fluid on the other to achieve the desired heat transfer. In this way temperature control is achieved indirectly without mixing of the reactant fluids with the auxiliary fluid media.

The PCHE panel design may include plates having passages etched on one side or both sides, and the panel may comprise an assembly of stacked plates consisting of un-etched plates (blanks) with suitably juxtaposed etched panels to form a desired passage assembly in the final panel. The stacked plates thereby form a laminar assembly of superposed metal plates wherein fluid flow channels are arranged according to a pre-determined pattern, said channel-bearing plates being aligned during superposition to define discrete heat exchange pathways for fluids, and the assembly is formed into a unitary heat exchanger panel by a diffusion bonding technique.

The profile of the channels, i.e. cross-sectional profile perpendicular to the flow path, is generally not critical but curved shapes are conventionally used and are relatively easy to form by chemical or hydraulic milling but other profiles could be adopted if desired by use of an appropriate tool in combination with the chemical or hydraulic process.

It will be understood that the plates having the appropriate channels defined by etching or the like are stacked and diffusion bonded together to form heat exchanger panels, and that such panels so formed can, if necessary, be juxtaposed and joined e.g. by welding to provide a larger panel of a desired height and width to match the required catalyst bed cross-sectional area. Use of blank (un-etched plates) is appropriate in some instances to complete a panel and close the open side of channels formed in an adjacent etched plate. The reference to panels is for convenience and is not intended to indicate a dimensional limitation. However, it will be appreciated that the dimensions of the heat exchanger unit will vary according to a chosen reactor design, and that currently available manufacturing equipment may impose some practical limitations on panel size in one step. If it is desired to form relatively large size panels, such practical limitations can be readily overcome by juxtaposition of a plurality of panels of a size formed within the capacity of the available equipment and joining thereof by a suitable method such as welding. In this way a variety of shapes and sizes of the PCHE panel can be constructed.

In use of such a PCR reactor, the heat exchanging fluid may be caused to flow in a direction substantially perpendicular to the flow of the reactant stream. Alternatively, the directions of flow may be substantially parallel and either co or counter current according to the operators choice taking account of the reaction process to be controlled.

The invention is primarily intended for use with reactions using heterogeneous catalyst systems.

Depending on the particular reaction, optimisation thereof may be obtained by providing more than one catalyst, and in particular by providing different catalysts in separate catalytic beds.

The heat exchanging fluid may be a liquid or gas, as is understood by those in this art. Such fluids typically include molten salts, molten metals or hot water to provide liquid auxiliary media or may be hot gases, steam or superheated steam whereby heat may be indirectly added to a reaction system. In the converse case chilled liquids or gases may be used. Chemical engineers will readily consider the wide range of auxiliary working fluids available and be aware of both sensible heat and latent heat considerations in matching the auxiliary fluid needed to the process demands of the reaction for conversion of the fluid reactant species.

Each heat exchanger stack or each auxiliary fluid media channel, or set of channels, may contain a different auxiliary fluid to optimise the temperature profile of the reactant fluid within the reactor.

According to another aspect of the invention, there is provided additional means to make the aforementioned reactor specifically suitable for use as a moving bed reactor, namely catalyst inlet means, catalyst outlet means and means for feeding new or regenerated catalyst into the catalyst inlet means, and further means to remove catalyst from the catalyst outlet means. Preferably catalyst is allowed to progress towards the catalyst outlet under the influence of gravity. The man skilled in the art will be aware of alternative manners in which moving bed reactors may operate and the scope of the invention should not be restricted to the particular method described herein.

In the case of such a moving bed reactor, the bed width is a multiple of the catalyst diameter preferably at least 3 times that diameter.

According to a still further aspect of the invention, there is provided a process for indirectly controlling the temperature profile of a reaction fluid in the presence of a catalyst during an endothermic or exothermic chemical reaction, comprising passing a reactant fluid from a reactant fluid inlet means in a reactor to a first catalytic bed before passing through a first channel or set of channels in a printed circuit heat exchanger (PCHE) and subsequently passing to a second catalytic bed; passing a heat exchanging fluid from a heat exchanging inlet means to a heat exchanging outlet means through a second channel or set of channels in a second printed circuit heat exchanger (PCHE); and exchanging heat between the heat exchanging fluid and the reactant fluid whilst passing through the said printed circuit heat exchanger (PCHE); the products of the reaction leaving the last catalytic bed being passed to a reaction fluid outlet means.

In an alternative embodiment, the process for controlling the temperature profile of a reaction fluid in the presence of a catalyst during an endothermic or exothermic reaction further comprises passing catalyst through the catalytic bed, catalyst leaving the bed being replaced by new or regenerated catalyst.

In a preferred embodiment, the heat exchanging fluid flows in a direction substantially perpendicular to the flow of the reactant stream. Alternatively, the directions of flow may be substantially parallel and either co or counter current.

The heat exchanging fluid may be liquid or gas, as is recognised already in the prior art. Such fluids include molten salts, molten metals, boiling water, steam or superheated steam, for example.

It will be recognised that the invention in its broadest aspect provides a staged reaction system containing successive chemical reaction zones and heat transfer zones, the latter containing plate heat transfer surfaces bearing microchannels etched therein according to a pre-determined pattern, and offering the optimum indirect heat transfer strategy and the ability to individually prepare fluid reactants thermally for the next reaction zone by selection of the inlet channel and its relationship to adjacent auxiliary fluid channels. The system can be specifically designed to handle substances of different volatilities.

DESCRIPTION OF THE DRAWINGS

Non-limiting embodiments of the invention will be described hereinbelow with reference to the accompanying drawings in which.

MODE FOR CARRYING OUT THE INVENTION

Figure 1:
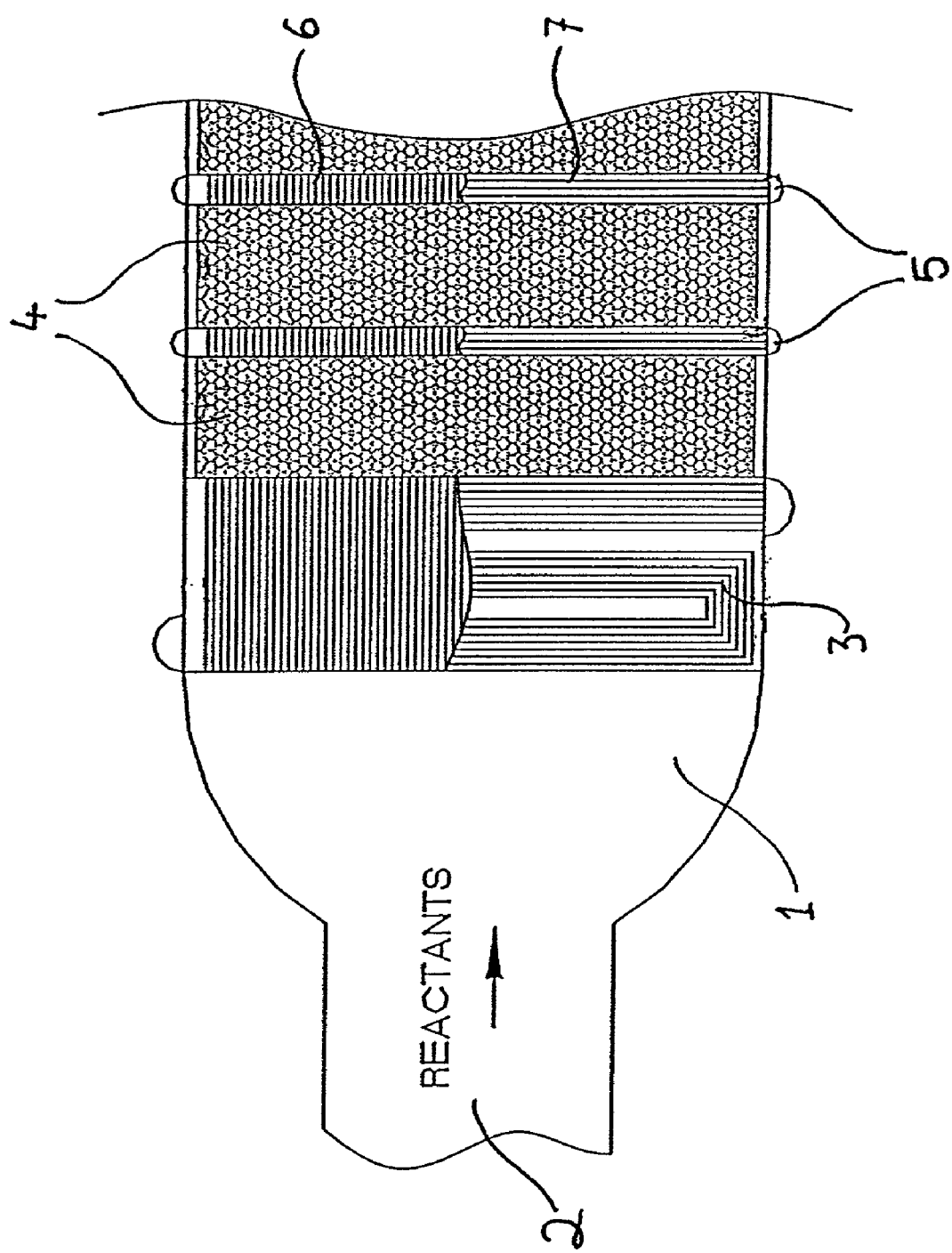
FIG. 1 is a sectional side view of part of a reactor in accordance with the present invention.

Referring to the drawings, FIG. 1 shows a reactor 1 provided with a reactant fluid inlet 2 and a reactant fluid outlet (not shown) through which a reactant fluid to be processed is passed.

The reactor 1 comprises at least one catalytic bed 4. Where the apparatus is configured as a moving bed reactor, the catalyst bed 4 is substantially vertical, to facilitate movement of the catalyst through the chamber.

Provided adjacent to the catalytic bed reactor 4 are printed circuit heat exchangers (PCHE) 5. The PCHEs 5 have at least two sets of channels formed therein, a first set of channels 6 provided for passage of the reactant fluid from a first catalytic bed 4 to a second, and a second set of channels 7 through which the heat exchanging fluid flows. The first of the PCHEs 5, in communication with the reactant fluid inlet 2, contains pre-heat channels 3. These pre-heat channels 3 are extra vertical passages in which heat exchanging fluid flows and heats the reactants to a suitable temperature for reaction prior to the reactants entering the first catalytic bed 4. In this example the pre-heat channels 3 make three passes across the reactant flow, although this is an arbitrary figure.

An optional screen of a fine mesh suitably dimensioned according to the size of the catalyst particles is provided to cover the ends of the reactant fluid channels adjacent to the catalytic beds to prevent migration of catalyst into said channels, especially the down stream channels with respect to the catalyst to reduce the risk of blockages inhibiting flow.

The channels are formed by joining individual plates together, said plates having channels formed in at least one surface, such as by a milling or etching process. In order to ensure the crevice-free design, any joining process used to join adjacent plates together should avoid interference with the milled or etched channels. This therefore limits the acceptability of use of conventional welding processes. However, diffusion bonding processes, wherein the plates are placed under pressure and heated close to the melting temperature of the plate metal thereby encouraging grain growth across the boundary, allows such a crevice-free design. This also enables the plates to be joined adjacent each of the channels, increasing the mechanical capabilities of the channels and allowing greater pressure differentials between the pressure of the reactant fluid and the heat exchanging fluid. This design of heat exchanger has been proven by the designers of the proposed PCR since 1985 when Heatric first introduced its compact printed circuit heat exchangers (PCHEs). The application of the diffusion bonding technique is now understood in the art.

The design of such heat exchangers also facilitates a greater rate of heat exchange in a given volume, reducing the space requirements for a given reaction. Thus incorporating them in a custom reactor design offers hitherto unforeseen advantages.

Depending on the performance requirements of the reactor 1, additional catalytic beds 4 may be provided, spaced apart by additional heat exchangers 5. The final catalytic bed 4 in the series is in communication with the reactant fluid outlet means to enable the exit of the products of the reaction from the reactor 1.

In the alternative embodiment wherein the apparatus is adapted to be suitable for use as a moving bed reactor, catalyst outlet means (not shown) are provided adjacent the lower end of each of the catalytic beds 4, through which the catalyst is urged by means of gravity. The catalyst leaving the catalytic beds 4 may be fed to a regenerator and then passed through catalyst inlet means (not shown) provided adjacent the top of each of the catalytic beds 4. Alternatively, new catalyst material may be passed through the catalyst inlet means, consequent to exit of catalyst through the outlet means.

Thus the apparatus of the invention facilitates a series of adiabatic reactions, the temperature of the reactant stream being altered between successive reactions to maintain the reaction temperature within an acceptable range and thus conform to the desired temperature profile.

Figure 2:
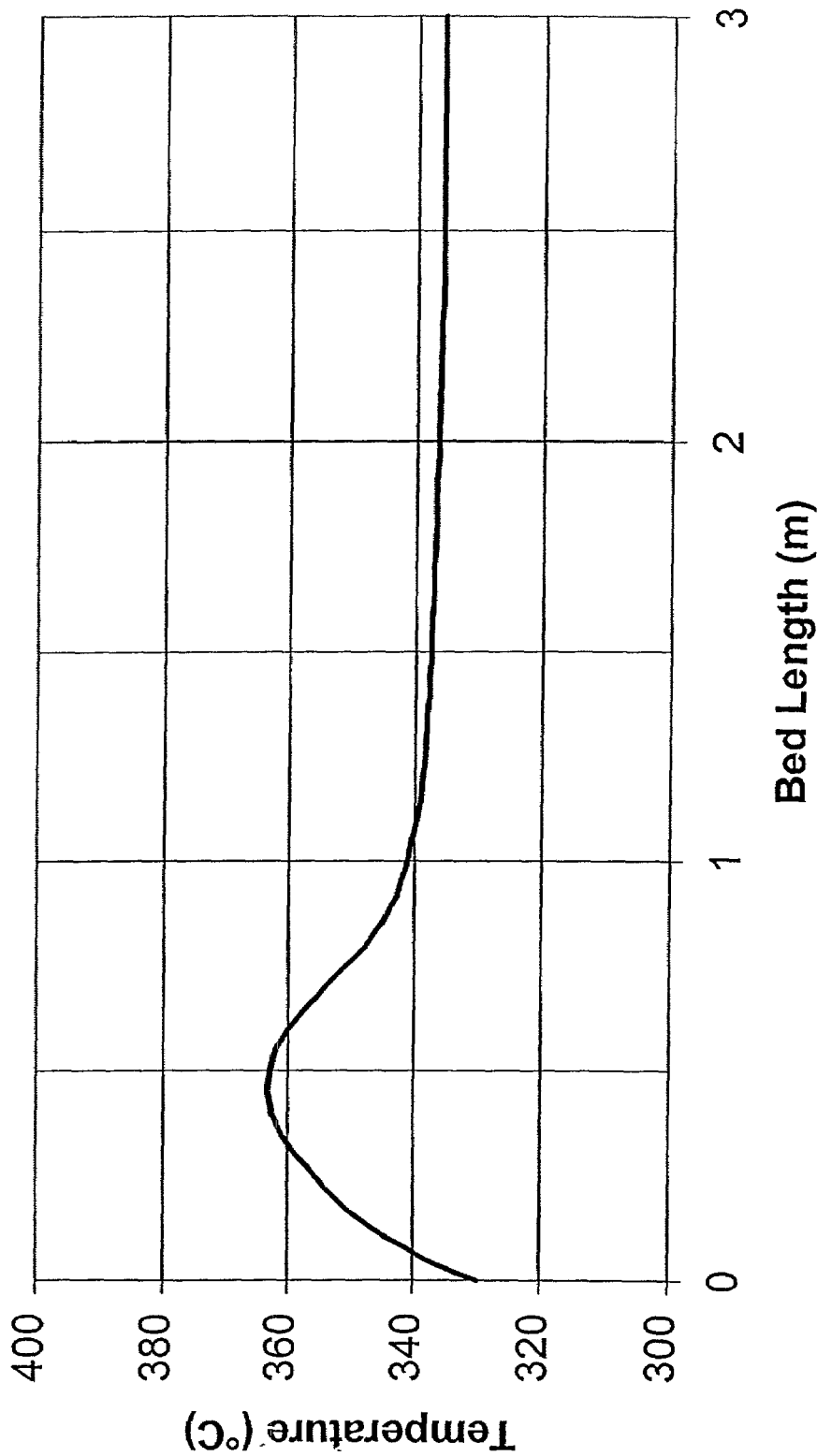
FIG. 2 shows the temperature profile for a highly exothermic reaction demonstrating "hot-spot" problems.
Figure 3:
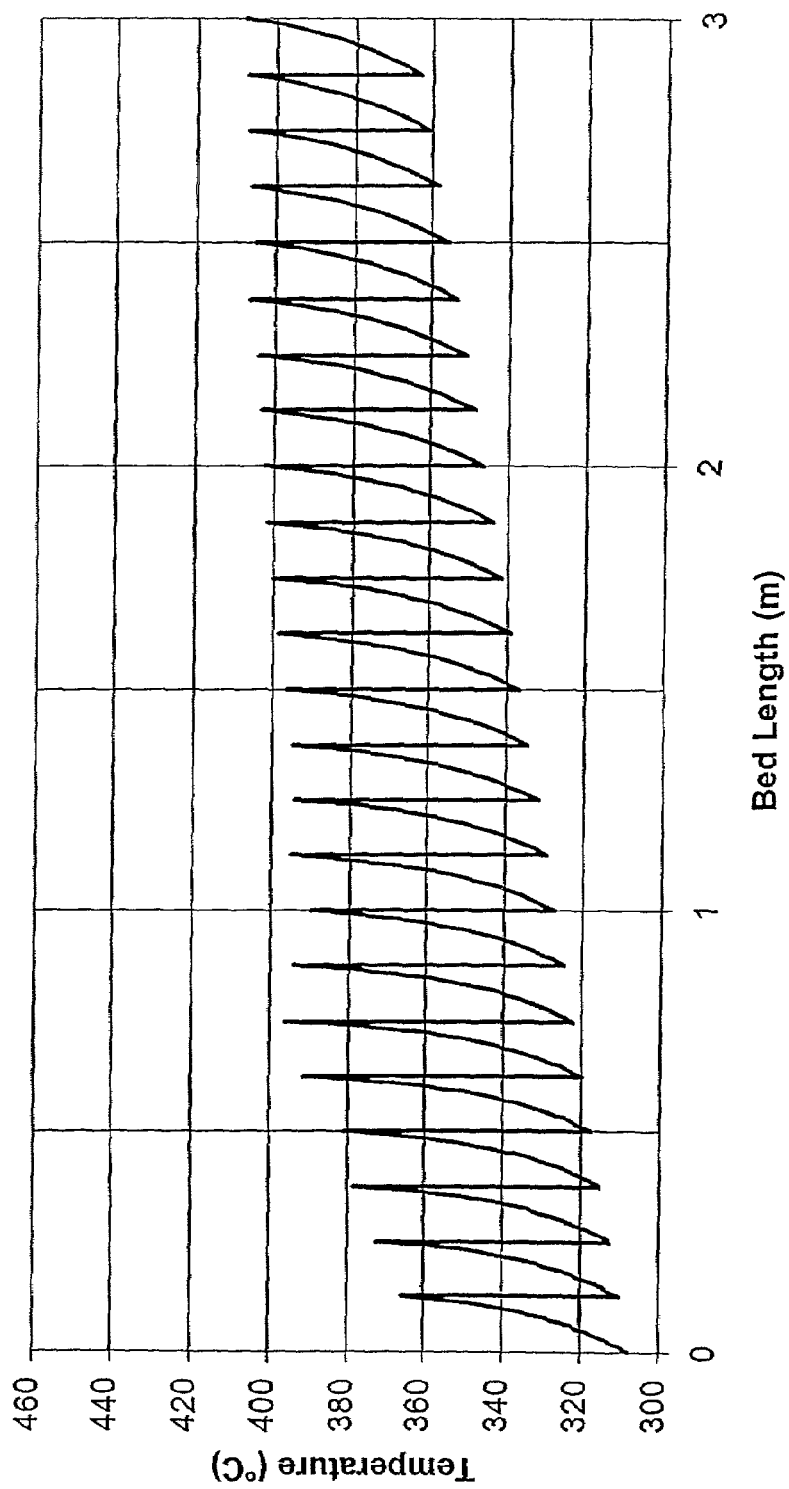
FIG. 3 in contrast to FIG. 2 shows the temperature profile for an exothermic reaction controlled by means of a tubular reactor designed in accordance with the present invention.

FIG. 2 illustrates the temperature profile of a poorly controlled exothermic reaction (phthalic anhydride production), typical of a tubular reactor, showing severe hot spot development. Excessive inlet temperature leads to thermal runaway which under these hot-spot limited conditions leads to restriction of o-xylene feed. In contrast, a reactor containing 24 catalyst beds including PCHE stages between catalyst beds enables a very controllable process having the temperature profile illustrated in FIG. 3. This shows temperature build up in the catalyst bed (process development left to right) as an inclination and heat exchange by a sharp declination. A significant safety margin over thermal runaway is maintained by low inlet temperature and short catalyst beds (about 125 mm), even with a higher o-xylene concentration that can typically be fed to a tubular reactor. However, the average temperature gradually rises in a controllable and predictable manner as the reactants progress through successive catalytic beds to enable increase reaction rate in later stages where the threat of thermal runaway is much reduced.

The number of heat exchangers to be used is calculated in accordance with methods known to the man skilled in the art in order to avoid hotspots and to allow the process to run at a higher load of feed per unit of flow rate.

Figure 4:
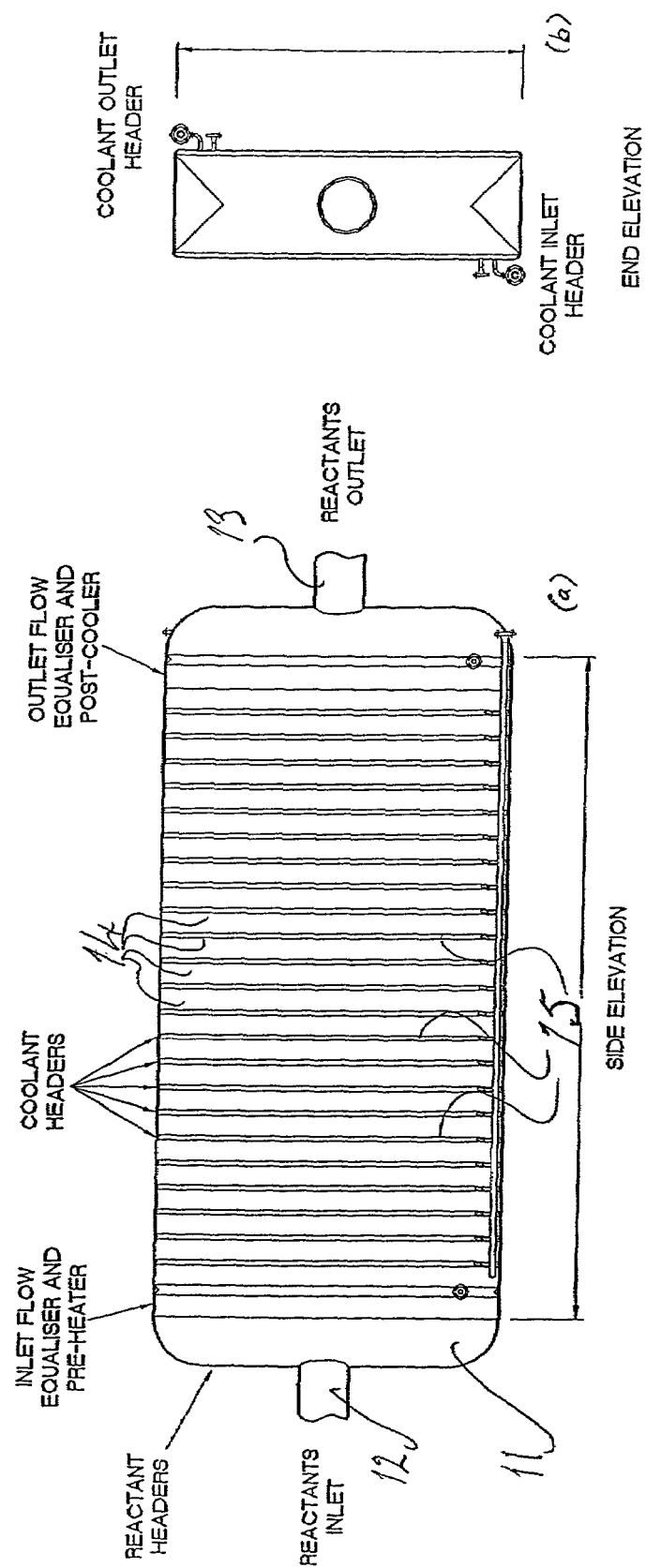
FIG. 4 shows a printed circuit reactor in side elevation (FIG. 4(a)), and in end elevation (FIG. 4(b)).

FIG. 4 illustrates a printed circuit reactor 11, suitable for use in the production of phthalic anhydride, and having a reactant fluid inlet 12 for receiving reactant fluid to be processed and a fluid outlet 13 through which a product can be recovered.

The reactor 11 comprises at least one catalytic bed 14 in communication with the reactant fluid inlet 12. Provided adjacent to the catalytic bed reactor 14 are printed circuit heat exchangers (PCHE) 15.

The invention claimed is:

1. A reactor comprising
   (a) a reaction zone that receives reactants for reaction purposes; and
   (b) a heat exchanger in operative contact with the reaction zone so as to receive the reactants exiting the reaction zone for heat exchange purposes, wherein the heat exchanger is formed from a heat exchange panel that includes a plurality of superposed metal printed circuit heat exchange (PCHE) plates bearing fluid flow channels, the channel-bearing PCHE plates being (i) aligned during superposition to define discrete heat exchange pathways for fluids, and (ii) diffusion bonded together.

2. A reactor according to claim 1, wherein the reaction zone comprises at least one catalyst bed.

3. A reactor according to claim 1, wherein the fluid flow channels are formed by chemically etching the channel-bearing PCHE plates.

4. A reactor according to claim 1, wherein the fluid flow channels are formed by hydraulically milling the channel-bearing PCHE plates.

5. A reactor according to claim 1, wherein multiple heat exchange panels are embedded within the reaction zone, and wherein a contact face area of the panels is generally equal to a contact face area of the reaction zone.

6. A reactor according to claim 1, wherein a plurality of reaction zones are arranged in succession, and wherein a heat exchange panel is arranged between each set of adjacent reaction zones.

7. A reactor according to claim 6, wherein at least three reaction zones are arranged in series.

8. A reactor according to claim 6, wherein the heat exchange panel has a thickness of up to about 100 mm.

9. A reactor according to claim 1, wherein the heat exchange panel includes passages comprising tortuous pathways with one of convolution and zigzags.

10. A reactor according to claim 1, wherein the reaction zone comprises a catalyst bed including a variable form catalyst.

11. A reactor according to claim 1, further comprising a screen that restrains catalyst particles from entering the passages of the heat exchanger panel.

12. A reactor according to claim 1, wherein the fluid flow channels are formed with a tool.

13. A reactor according to claim 12, wherein the fluid flow channels are formed with a water jet.

14. A reactor according to claim 1, wherein the heat exchange pathways are completely separated from one another to prevent contact of the fluids flowing along the respective pathways and to prevent the reactants from reacting within the pathways.

15. A reactor according to claim 1, further comprising:
   a reactant fluid inlet;
   a reactant fluid outlet;
   first and second adjacent catalyst beds each including a catalyst; and
   at least two channels that are formed in the PCHE that are separated from one another, the first channel permitting flow of reactant fluid from the first catalyst bed to the second catalyst bed, and the second channel permitting flow of a heat exchange fluid therethrough.

16. A reactor according to claim 15, wherein the reactor is a moving bed reactor, and wherein a catalyst outlet is provided adjacent a lower end of each of the catalyst beds such that the catalyst can be urged through the catalyst outlet by gravity and catalyst can be passed through the catalyst inlet.

17. A reactor according to claim 15, further comprising an additional heat exchanger in communication with the reactant fluid inlet, the additional heat exchanger containing pre-heat channels.

18. A reactor according to claim 15, further comprising a fine mesh that covers ends of the channel adjacent the catalytic beds.

19. A reactor according to claim 15, wherein the heat exchanger is formed from plates, the plates being diffusion bonded together.

20. A reactor according to claim 15, wherein the heat exchanger includes passages comprising tortuous pathways with at least one of convolutions and zigzags.

21. A reactor comprising:
   (a) a reaction zone that receives reactants for reaction purposes; and
   (b) a heat exchanger in operative contact with the reaction zone so as to receive reactants subseciuently exiting the reaction zone for heat exchange purposes, wherein the heat exchanger is formed from a heat exchange panel that includes a plurality of superposed metal printed circuit heat exchange (PCHE) plates bearing fluid flow channels, the channel-bearing PCHE plates being (i) aligned during superposition to define discrete heat exchange pathways for fluids, and (ii) diffusion bonded together, wherein the fluid flow channels do not extend completely through the plates.

22. A method for creating a highly uniform temperature profile for reactants moving through a reactor, the method comprising the steps of:
   (a) providing a heat exchanger to receive reactants for heat exchange purposes that is formed from a heat exchange panel that includes a plurality of superposed metal printed circuit heat exchange (PCHE) plates fluid flow channels, the channel-bearing PCHE plates being (i) aligned during superposition to define discrete heat exchange pathways for fluids, and (ii) diffusion bonded together;
   (b) positioning the heat exchanger in operative contact with a reaction zone of the reactor that receives reactants for reaction purposes; and
   (c) directing the reactants exiting from the reaction zone subseciuently through the heat exchanger.

23. A reactor comprising:
   (a) a first reaction zone that receives reactants for reaction purposes;
   (b) a heat exchanger in operative contact with the first reaction zone so as to receive reactants from the first reaction zone for heat exchange purposes, wherein the heat exchanger is formed from a heat exchange panel that includes a number of superposed metal printed circuit heat exchange (PCHE) plates bearing fluid flow channels that define discrete fluid pathways; and
   (c) a second reaction zone in operative contact with the heat exchanger opposite the first reaction zone that receives reactants from the heat exchanger for reaction purposes.

* * * * *